Figure 1:
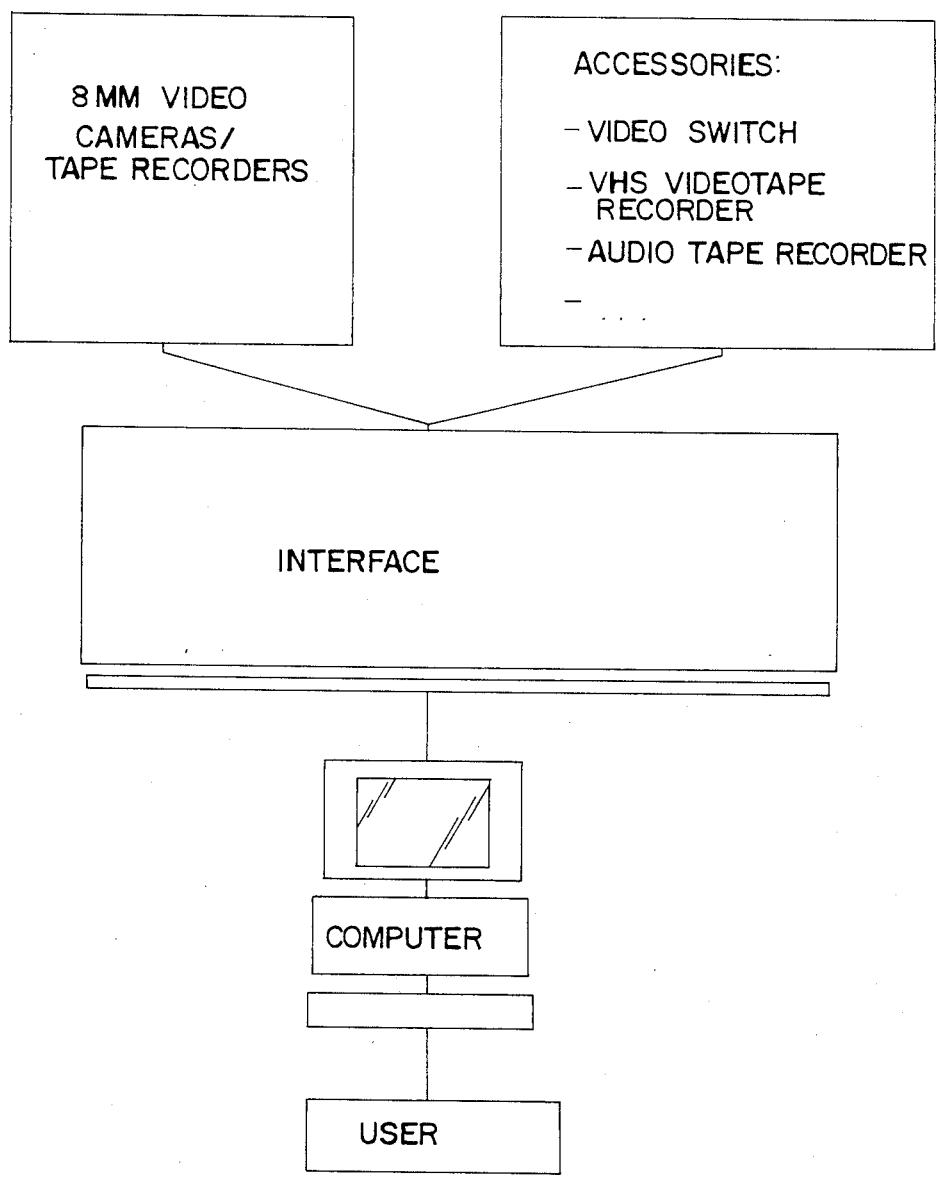

United States Patent [19]

Falck

[11] Patent Number: 4,985,783

[45] Date of Patent: Jan. 15, 1991

[54] PILOTING INTERFACE FOR 8 MM VIDEO CAMERAS AND VTR'S AND ACCESSORIES, BY COMPUTER

[76] Inventor: Francis Falck, 6 rue de Schifflange, 67410 Drusenheim, France

[21] Appl. No.: 338,778

[22] Filed: Apr. 17, 1989

[30] Foreign Application Priority Data

Apr. 18, 1988 [FR] France .................. 88 05265

[51] Int. Cl.$^5$ ............................................. H04N 5/76
[52] U.S. Cl. .................... 358/335; 358/906; 358/210
[58] Field of Search .............. 360/10.1, 10.2, 10.3, 360/14.1, 14.2, 14.3, 70, 13, 79, 33.1; 364/238.5, 239, 239.2, 239.9, 240.1; 358/143, 141, 906, 909, 335, 210

[56] References Cited

U.S. PATENT DOCUMENTS

| | | | |
|---|---|---|---|
| 4,394,694 | 7/1983 | Ninomiya et al. | 360/14.3 |
| 4,473,853 | 9/1984 | Corkery | 360/14.3 |
| 4,507,691 | 3/1985 | Ishiguro et al. | 360/14.3 |
| 4,578,718 | 3/1986 | Parker et al. | |
| 4,837,638 | 6/1989 | Fullwood | 360/14.3 |
| 4,839,745 | 6/1989 | Tindall | 360/38.1 |

OTHER PUBLICATIONS

"Coach: A Tool for Centralized Maintenance", *S.M.P.T.E. Journal*, vol. 95, No. 7, Jul. 1986, by P. Schmale, pp. 736-740.
"Video Disc Programming for Interactive Video", *Wireless World*, vol. 89, No. 1574, Nov. 1983, by P. Barker, pp. 44-48.

*Primary Examiner*—Robert L. Richardson
*Attorney, Agent, or Firm*—Young & Thompson

[57] ABSTRACT

An interface, which permits, through the aid of a computer, to pilot 8 mm video cameras and VTR's and other accessories such as a video switching device, the pause function of an audio tape recorder and VTR's or other electrically or electronically remotely controllable apparatus. It is comprised of an electronic converter card series/parallel-parallel/series which converts the RS232 series signals from a computer into a set of parallel signals, which will be transformed by a master card into series signals for the remote control of 8 mm video cameras and VTR's and into remote control signals for other accessories. Thus, all functions of this apparatus can be piloted by computer. The delineation of video sequences on 8 mm video cassettes of the video cameras and VTR's is realized through a device integrated with the master card, which decodes the information in the remote control signal from the counter which is sent to the computer through a series/parallel-parallel/series converter card. Two other optional cards, one a video switch which allows the selection of the video source to be viewed, the other a set of remote control exit interfaces, are integrated with the interface. The interface according to the present invention is particularly designed for computer interactive image applications, as an editing table, or to make animated films.

5 Claims, 2 Drawing Sheets

PILOTING INTERFACE FOR 8 MM VIDEO CAMERAS AND VTR'S AND ACCESSORIES, BY COMPUTER

The present invention relates to an "interface" which allows the simultaneous control of one or more video cameras, and one or more video tape recorders (VTR's), which have a counter, and a remote control jack, and other apparatus which is remotely controllable, such as a video switcher, the pause function of a VTR, the pause function of an audio tape recorder, or a slide projector through the use of a computer.

This invention relates to the fields of electronics, computers, and video.

The distinguishing feature of the present invention from others in the field, i.e. video discs, umatic control of VTR's, VHR, etc., which may or may not use a computer, is the use of one or more VTR's and video cameras as a source of images. The user may thus use his own recordings (which the video disc does not) and incorporate them into an interactive video computer system.

The versatility of the configuration of video camera and VTR permitted by the present invention allows its adaptation to numerous uses which up to the present were difficult to obtain. The camera functions may be controlled simultaneously in the same manner as the VTR functions.

Contrary to other devices, the present invention does not require any electric or electronic intervention of the support apparatus, other than that conceived by the manufacturer.

Finally, the access time to the images on a video cassette is only a few seconds, making the invention one of the fastest, if not the fastest video computer interactive system after the video disc.

The present invention is comprised of a set of electronic cards, which may be internal or external to the computer, which through the appropriate software permits the simultaneous control of video cameras, and VTR's, and other accessories described above. It is essential that 8 mm video cameras and VTR's be equipped with a counter, and a remote control jack. The computer must be equipped with a series exit port RS232, or an interface card parallel entry exit, at least 16 lines, preferably level TTL.

The first function of the present invention permits the simultaneous remote control of all functions of one or more 8 mm video cameras, or VTR's, and of all the accessories described above, through a computer, either directly or through program mode.

The second function of the present invention permits the selection by computer of the images and sounds of one or more video cassettes in 8 mm video cameras, and VTR's, allowing the user to:

visualize, or transfer the video images chosen from one or more 8 mm video cassettes and to associate them with text, images, graphics, or designs generated by the computer or other source. These images can be viewed each on their own screen, or on a common screen, either through a video switch integrated as an accessory to the present invention, assuring the selection of the image and sound to be viewed, or by using an image superposition apparatus, not part of the present invention.

place in a computer memory the selection of one or more video sequences, derived from one or more video cassettes, to be recalled in any order, at any time, to be integrated in one of the other functions, or to copy them from one VTR to another.

The present invention can consist of electronic cards incorporated directly into a computer.

To this end, the present invention adapts the series or parallel electronic signals generated by a computer to the necessary protocol to control by remote control the apparatus described above. The bi-directional series signal which allows the control of 8 mm video cameras, VTR's, or video cameras, VTR's is constituted by a set of a minimum of 8 words each comprising one starting bit, and 8 bits of data, of approximately 100 us. Each word has a length of between 1100 us, and 1800 us.

Figure 2:
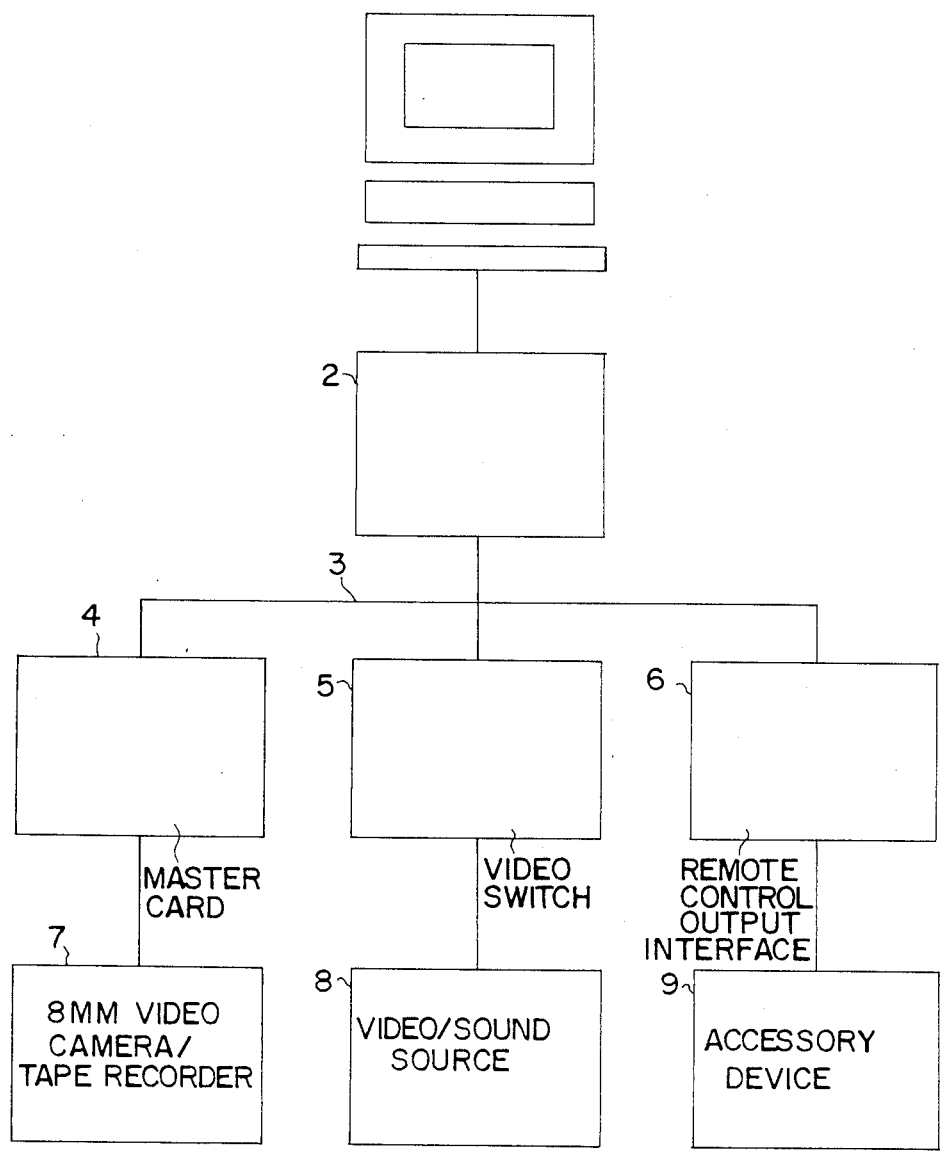

FIGS. 1 and 2 depict two embodiments of the invention for effectuating an interface between a computer and video apparatus such as cameras and VTR's to implement remote control functions.

In order to control the 8 mm video camera, and VTR's, and other accessories, the present invention is comprised of various sub-sets, which according to a preferred embodiment, is shown in FIG. 2, as follows:

a converter card series/parallel-parallel/series (2) characterized in that on the one hand, the signals from the series exit RS232 of all computers equipped with this outlet are transformed into parallel signals of a minimum of 8 lines which can be used by the present invention to control 8 mm video cameras and VTR's, and accessories, and on the other hand, a parallel/series converter which converts the parallel data (8 or more) originating from the present invention, and which controls the counter indicator of 8 mm video cameras and VTR's into a series signal RS232 going toward the computer. The parallel information is regrouped on a command bus (3) of the present invention, and is comprised of a minimum of 16 parallel lines. The said card is designed around a universal asynchronous emitter-receiver (UARTY AY3 1015 or equivalent), and its command logic. A variable frequency dividable timer, with a quartz oscillator times the asynchronous emitter-receiver. A switching device permits the selection of the transmission speed (number of bands), the number of data bits, stops, and parities. A 3-state memory buffer is used to link the parallel exit and entry ports to the command bus of the interface. This allows the card (2) to be electronically disconnected, and to connect the bus directly to the parallel entry-exit ports coming from a computer card. A resistor-condenser circuit assures the resetting of the timer to zero, when current is passed through the set. At the entry-exit of the RS232 series signal, an adapting device permits the transformation of the RS232 levels to TTC signals, and vice versa.

a command bus (3) characterized in that it has at least 16 parallel entry-exit command wires a current stabilizing device characterized by its function of transforming regular current into a continuous stabilized current, necessary to the function of the apparatus. The continuous stabilized current might also be derived from a source external to the interface.

a piloting switch for 8 mm video cameras, and VTR's characterized by a device which selects according to the information on the command bus which apparatus to pilot, through an analogic switch (type CD 4066 or equivalent).

a timer characterized by an oscillator, delivering a quartz pilotable or adjustable squared signal frequency, providing better stability in signal time produced. This timer is synchronized by the starting bits of the series signal produced by the 8 mm video cameras and VTR's, and controls the cadence of the master card.

a series-parallel converter characterized by a signal transformation device which transforms parallel signals from the command bus into series signals which control the remote control of 8 mm video cameras and VTR's. The code for the series of 8 bits contained in the first two bits permits the remote control of all camera and VTR functions. Optionally, this circuit may be comprised of a series-parallel converter characterized in that it decodes the words 2, 3 and 4 of the series signal, indicating the state of function of the 8 mm video cameras, and VTR's piloted, into a parallel signal sent on the command bus.

a series-parallel converter which decodes the words 6, 7 and 8 of the series signal of 8 mm video cameras, and VTR's into a parallel signal containing the counter signals. In effect, the words 7 and 8 contain multiplexed information of the counter, and the word 6 contains the algorithm of the code for words 7 and 8. The information pertaining to words 7 and 8 is stored successively in memory according to the algorithm information provided by word 6. These memories each have their own addresses, and can be read alternatively by the command bus of the interface. One preferred embodiment uses classic parts and logic circuits. Another preferred embodiment uses a micro-processor type 8052 or equivalent.

remote control exit interfaces which transform the command signals of the command bus into activating signals, either through open collector transistors or by electromechanical or electronic relays, or other equivalent systems, e.g. opto-couplers, etc. These interfaces permit the remote control of the accessories or other devices (9) which might be connected to the interface.

a video switch permitting the selection of signals from one of the video and sound sources to be viewed on a monitor or television. The switch is characterized in that it uses analog switches (type CD4066 or equivalent) operating the switching through signals normally present on a jack. The switching is remote controlled by the information sent on command bus by the computer.

The electronic circuits are contained on one or more printed circuits. They can be contained in one or more encasements. Or the circuit boards can be inserted directly into a specific apparatus, e.g. oscilloscope, computer, etc.

This interface, in association with the appropriate software permits the user to:

select in advance on one or more 8 mm video cassettes sequences or images and sound and to present the same during a conference for example.

to edit sound and video films.

to insert one's own images and sound in a computer program (questions asked by a computer, and images shown as a function of the response).

to associate and superpose VTR images with other images.

to use an 8 mm video camera for animated films.

What is claimed is:

1. An interface which permits the remote control by computer of 8 mm video cameras and VTR's with a counter and remote control jack, and accessories such as a video switch, the pause function of a VCR or audio tape recorder which can be controlled by remote control, and generally all apparatus which can be electronically remote controlled, comprising a series/parallel-parallel/series electronic converter circuit which transforms on the one hand the series signal type RS232 from a computer into parallel signals or 8 or more bits, and on the other hand the parallel signals of 8 bits or more generated by a master card into a series signal type RS232 sent back to the computer, the whole of these parallel signals from this converter circuit being hereinafter called the interface command bus; a master card connected in a manner such that it receives on the one hand the bi-directional parallel signals from the command bus, and on the other hand the bi-directional series signals permitting the remote control and the decoding of the counters of 8 mm video cameras and VTR's; a video switching card connected to the command bus which permits the selection among different sources of video signals which are sent to a monitor, or television; a card constituted of exit interfaces connected to the command bus, and to the accessories, which permits the remote control by the appropriate jacks, and connectors, of one or more of the functions of the accessories connected to the interface as a result of the information sent by the computer to the command bus.

2. An interface according to claim 1, wherein said series/parallel-parallel/series converter circuit has a quartz timer, equipped with a frequency divider permitting the selection of the number of bands of the series signal type RS232, this timer signal permitting the determination of the cadence of information going to and coming from an asynchronous emitting-receiving device, wherein the command register of the parity bits, the stop bits and data bits of said bi-directional series signal are capable of being selected by a switch, and wherein the parallel information is sent by the interface command bus through a set of three state memory buffers, thereby permitting by variation to set the memory buffers at high impedance to connect directly the interface command bus to the 16 parallel entry/exit lines of a computer.

3. An interface according to claim 1, wherein said master card has a timer synchronized by the bits emanating from the remote controlled series signal of 8 mm video cameras and VTR's, this signal being comprised of 8 words or more each having a length of approximately 1100 to 1800 μs, each containing a starting bit, and 8 bits of data, said timer thereafter synchronizing on the one hand a converter device converting the parallel signals of the command bus into a series signal sending 8 bits of data in each of the first two words, thereby allowing the remote control of all the functions of the various apparatus, and on the other hand, a decoder, selector device for the words 6, 7 and 8 of the remote control series signal of 8 mm video cameras and VTR's which alternatively stores, according to an algorithm given by the bits in word 6, the information regarding the counters contained in words 7 and 8, into memories which can be read by the computer through the intermediary of the command bus.

4. An interface according to claim 1 characterized in that the said video switching card has a series of analog switches which switch all or part of the video signals from different sources, in order to send them to one or more monitors or televisions, these analogic switches being controlled through a decoding device by information from the computer through the command bus.

5. An interface according to claim 1 in which the card comprised of exit interfaces has a series of remote control devices for the accessories, comprised of transistors, circuit relays, entry/exit integrated circuits, or devices which adapt the command signal of the interface command bus into a signal for the command of the accessory.

* * * * *